United States Patent [19]

Woodward et al.

[11] Patent Number: 4,563,630
[45] Date of Patent: Jan. 7, 1986

[54] METHOD OF GOVERNING A GENERATOR AND/OR APPARATUS FOR GOVERNING A GENERATOR

[75] Inventors: Jack L. Woodward; John T. Boys, both of Auckland, New Zealand

[73] Assignee: University of Auckland, Auckland, New Zealand

[21] Appl. No.: 564,512

[22] Filed: Dec. 22, 1983

[30] Foreign Application Priority Data

Dec. 22, 1982 [NZ] New Zealand .................. 202894

[51] Int. Cl.⁴ .............................. H02P 9/00
[52] U.S. Cl. ............................ 322/8; 322/4; 322/32; 322/35
[58] Field of Search .............. 322/4, 7, 8, 29, 32, 322/35

[56] References Cited

U.S. PATENT DOCUMENTS

| | | | |
|---|---|---|---|
| 2,376,421 | 5/1945 | Drake | 322/4 X |
| 4,219,768 | 8/1980 | Gobaud | 322/8 |
| 4,344,027 | 8/1982 | Karlicek | 322/7 |
| 4,399,397 | 8/1983 | Kleinschmidt, Jr. | 322/8 |

FOREIGN PATENT DOCUMENTS 2006998 5/1979 United Kingdom .............. 322/8

Primary Examiner—R. J. Hickey
Attorney, Agent, or Firm—Holman & Stern

[57] ABSTRACT

A method and apparatus for governing a generator which generator comprises micro-hydropower generating equipment usable in run-of-the-stream situations. A plurality of dump loads are associated with the electrical output of the generator and changes in frequency of the output phase voltage of the generator are detected. The dump loads are switched into or out of association with the generator in response to the frequency changes so as to cause substantially compensating frequency changes. The rate at which the compensating frequency changes occurs are damped desirably by use of a flywheel.

6 Claims, 43 Drawing Figures (a) No Load (b) Resistive Load

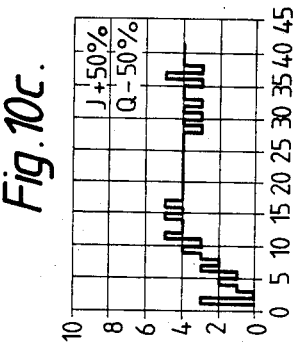
Fig. 10c.
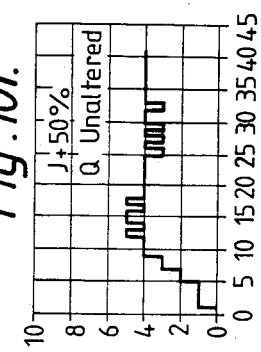
Fig. 10f.
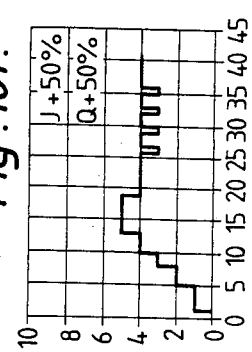
Fig. 10i.
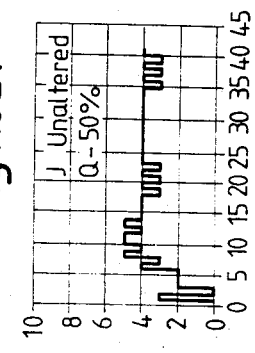
Fig. 10b.
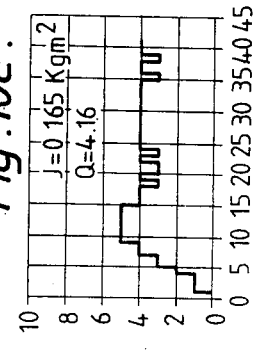
Fig. 10e.
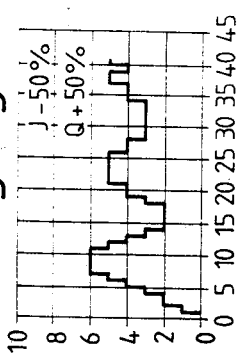
Fig. 10h.
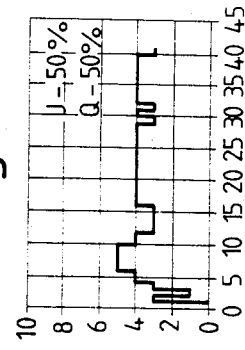
Fig. 10a.
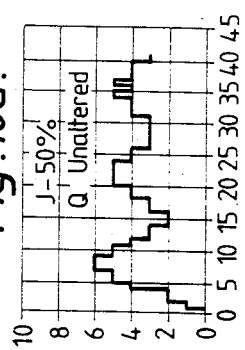
Fig. 10d.
Fig. 10g.

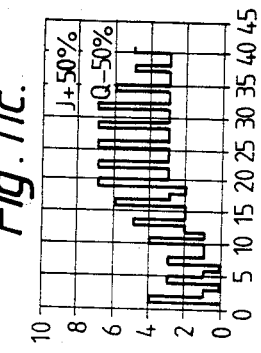 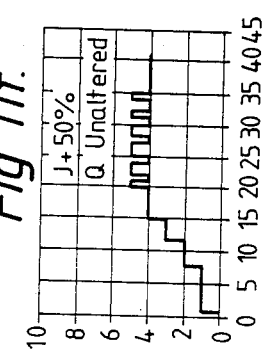 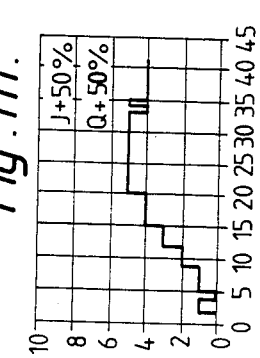
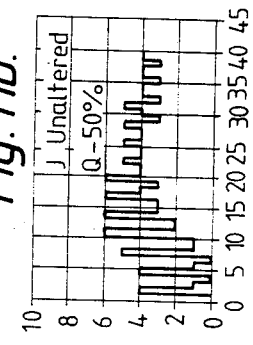 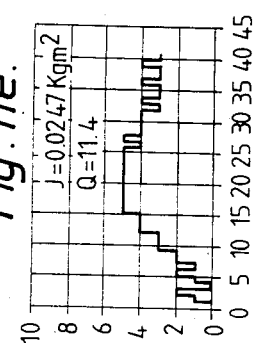 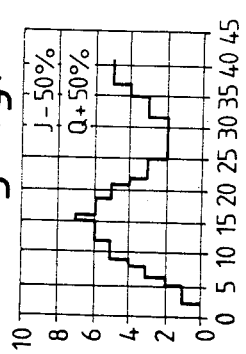
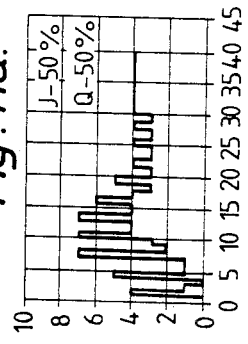 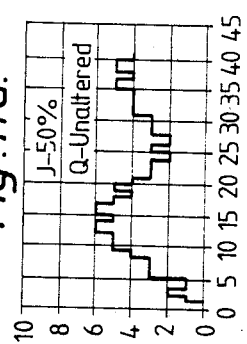 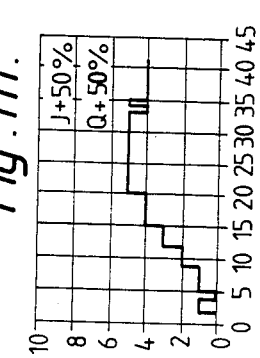

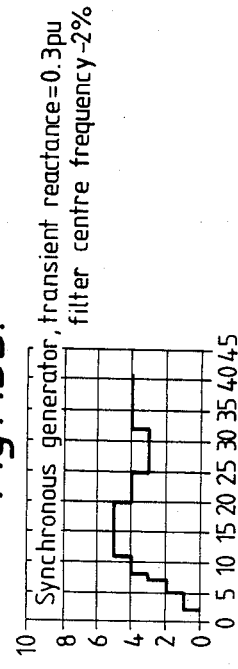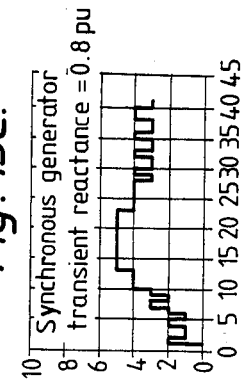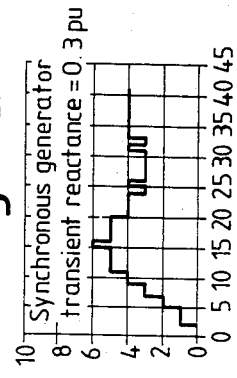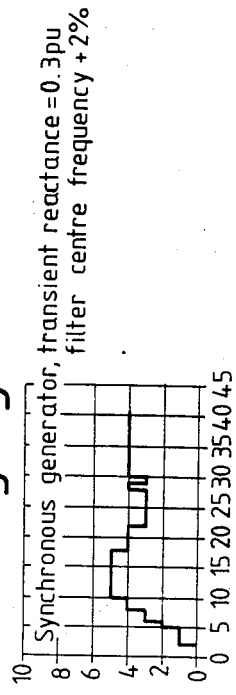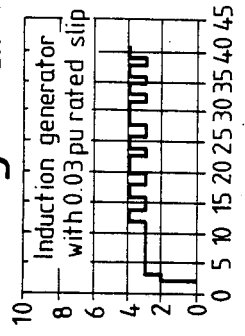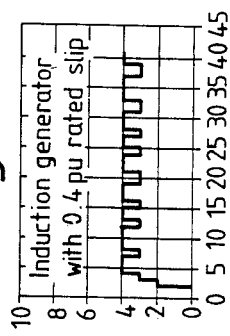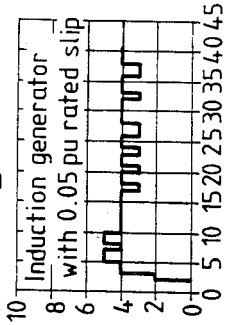

METHOD OF GOVERNING A GENERATOR AND/OR APPARATUS FOR GOVERNING A GENERATOR

This invention relates to a method of governing a generator and/or apparatus for governing a generator.

Smaller hydro-electric generating plants require a substantially greater cost per kw than a larger plant.

The cost of such plants arises in several ways. In the civil engineering involved in, for example, substantially complex stability calculations relating to water storage, penstocks and surge chambers, the provision of turbines, the cost of the generator or alternator equipment and switch gear and protective devices. With a small hydro-electric site, these costs can make a project economically unattractive. To some extent these problems can be overcome by using micro-hydropower generating equipment. Such constructions are able to utilize run of the stream situations without water control or by using a simple weir. No surge chambers are required and there are no stability restraints. Although simple turbines without governors can be used which allows home made turbines and centrifugal pumps to be utilized, a governor for the generator must be used. An electronic load governor has advantages in that the costs can be of the order of 20% of a mechanical governor and performance can be improved by a factor of about 5. A suitable generator is an induction motor with capacitive excitation but no cost reduction can be gained in the switch gear except that the costs are somewhat reduced by use of an induction motor.

In operation some fixed quantity of water flow is diverted from a stream and caused to flow through an ungoverned turbine. This turbine drives the alternator directly or with an appropriate belt, chain or gear drive. The speed of the set is controlled by maintaining a constant electrical load on the alternator thereby holding it at substantially constant speed.

The electronic load governor is utilized to perform this latter task. As the consumer load varies the electronic load governor switches power to a dump load holding the total load constant. Thus if a consumer load is switched on, the load governor will divert less energy to the dump load and vice versa.

An ideal governor would be an energy management system that allowed excess or suplus power to be diverted preferentially to non-essential tasks, e.g. crop drying and hot water heating. Ideally there will be no unwanted interaction between these dump loads.

Since only frequency is constant everywhere in a power system (both system voltage and current vary widely ($\sim \pm 5\%$) around the network) these "ideal" characteristics mean that frequency must be used as the control variable. Frequency can be determined by measuring the times between zero crossings of the phase voltages but the effect of switching a load on or off is to cause severe changes in these items thereby causing large (instantaneous) apparent frequency deviations.

An ideal governor would allow excess power to be diverted to practical uses with practical resistance values. It would switch on the zero crossings of the phase voltage to minimize harmonic distortion and RFI generation within the power system.

A simple schematic circuit for a single phase alternator 1 is shown in FIG. 1. It comprises a generator 2 for example a synchronous generator or an induction generator and an inductive reactance 3, commonly called the synchronous reactance.

External loads 4 may be connected to the terminal 5 of the alternator with voltage $V_T$. The instantaneous phase and frequency of the internal voltage of generator 2 are exactly related to the instantaneous position and speed of the alternator's input shaft. The terminal voltage $V_T$ differs from the internally generated voltage E by the voltage drop across the synchronous reactance 3.

Thus if an external load is switched on the output current will increase and there will be a phase difference between E and $V_T$. This is shown schematically in the vector diagrams of FIG. 2 which illustrate the effect of a resistive load.

In FIG. 2a (for no load) E and $V_T$ are identical in magnitude and phase. With resistive load (FIG. 2b) the terminal voltage $V_T$ (=IR) lags behind the internal voltage E because of the voltage drop across $X_s$ (=$IX_s$).

Thus the effect of switching on a resistive load is to cause the terminal voltage to lag in phase, or be delayed in time, relative to the internal voltage or shaft position. FIG. 3 shows these same voltages as functions of time for a resistive load switched on at t=0 as shown.

The effect of switching on a load at t=0 is to make the apparent period $\tau$ longer, thus the apparent instantaneous frequency is reduced.

The controller operating in response to this change in frequency, will switch off load to try to correct the apparent frequency change (thereby causing a phase deviation in the opposite sense). If the controller switches off more than the original load step then the system will be unstable.

In a practical case a governor should have a droop of the order of 2%. Thus a 0.1 pu load change should affect the frequency by $\sim 0.2\%$ or 0.1 Hz in a 50 Hz system. Practical alternators have synchronous reactances of $\sim 1$ pu so that a 0.1 pu change in load will shift the phase of the terminal voltage by approximately 6° giving an apparent change in frequency of 6/360=1.7%, more than eight times the allowable amount. Thus this concept must of necessity be unstable and the controller will simply switch all the load on and then off on alternate cycles that is to say at a 25 Hz rate.

The effect of changing the load on the alternator is to change the torque on the alternator drive shaft. The difference in the torque applied by the turbine and the alternator torque then causes the whole set to change speed at a rate determined by the total rotating inertia of the set.

Thus when consumer loads are applied the set slows down until the electronic governor removes some of the dump load. If the rate that the electronic governor removes load at is too slow then the whole set will "hunt" at a low frequency, typically varying from 47 to 53 Hz at approximately a 3 Hz rate.

Both of these unstable modes are interactive so that improving one generally makes the other worse which is disadvantageous.

It is an object of the present invention to provide a method of governing a generator and/or apparatus for governing a generator which will obviate or minimize the foregoing disadvantages or which will at least provide the public with a useful choice.

Accordingly in one aspect the invention consits in a method of governing a generator having an alternating output voltage comprising the steps of providing a plurality of dump loads electrically associated with said generator, measuring the alternating output voltage frequency detecting a change in measured output voltage frequency of said generator, varying the number of dump loads across the output of said generator in response to said detected frequency change to vary said alternating output voltage frequency so as to substantially compensate for said detected frequency change and damping the rate at which said alternating output voltage frequency change occurs.

In a further aspect the invention consists in apparatus for governing a generator comprising a plurality of dump loads associated or associable with the electrical output of said generator, detection means to detect a change in the frequency of the output phase voltage of said generator, switching means to, in use, switch one or more said dump loads into or out of association with said generator in response to a frequency change detected by said detection means so as to cause a substantially compensating frequency change, and damping means to damp the rate at which said compensating frequency change occurs.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention will now be described with reference to the accompanying drawings in which:

FIG. 1 comprises a simple schematic circuit for a single phase alternator;

Figure 1:
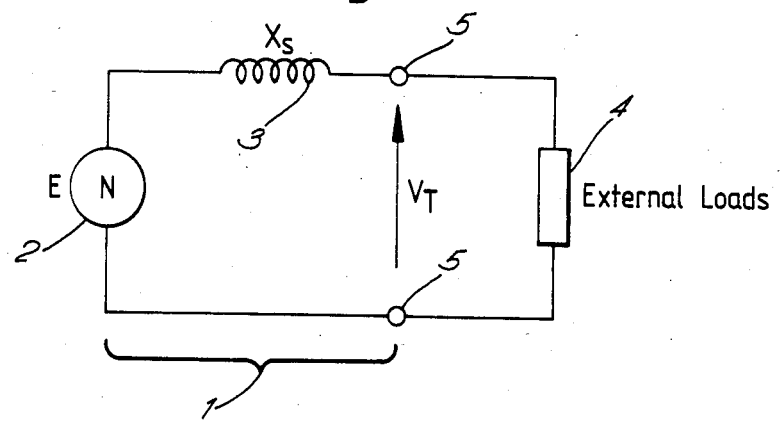
Figure 2:
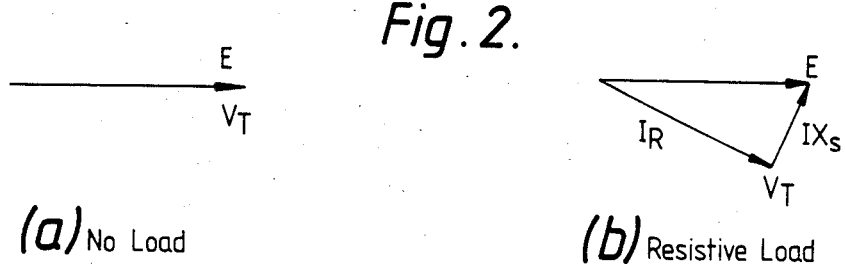
FIG. 2 shows diagrams representing the interanally generated voltage of the generator and the terminal voltage under no load and resistive load conditions.
Figure 3:
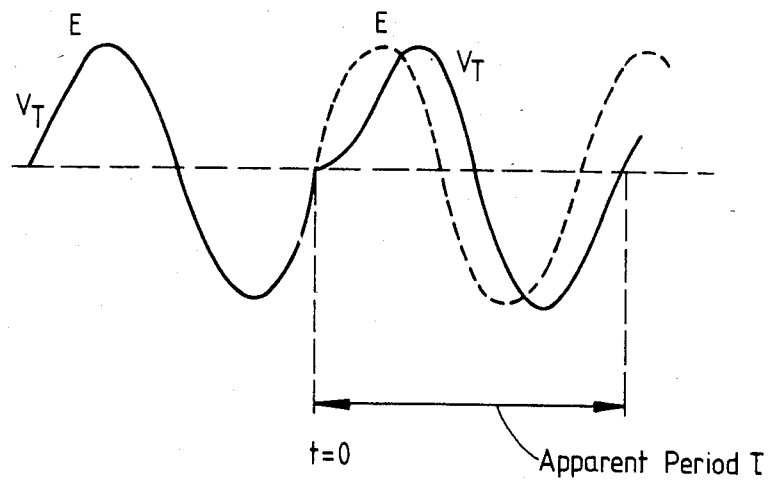
FIG. 3 shows the voltages of FIG. 2 as functions of time showing the effect of switching on a resistive load.
Figure 4:
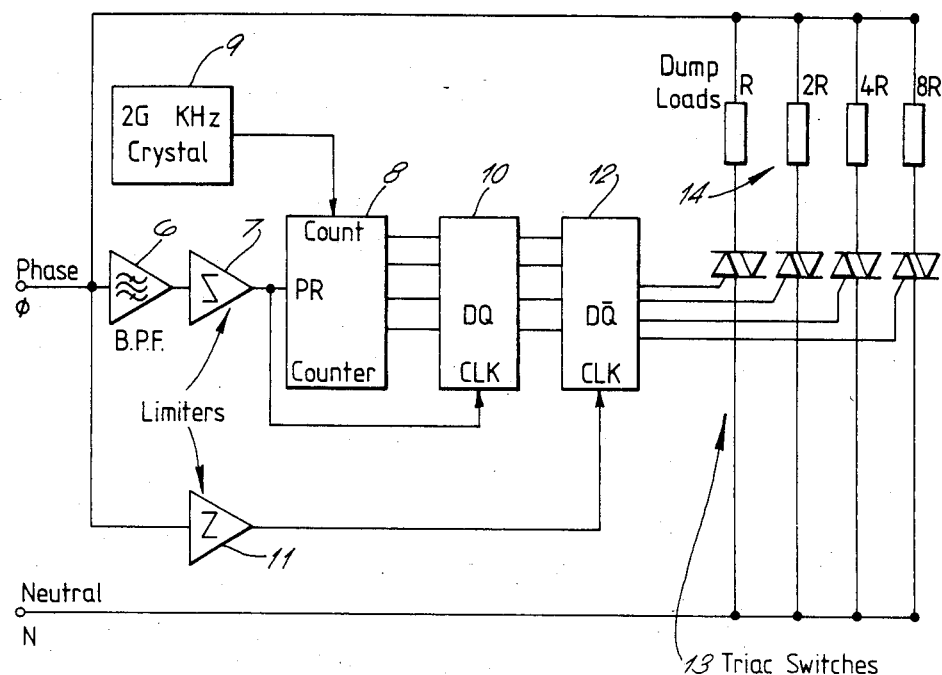
Figure 5:
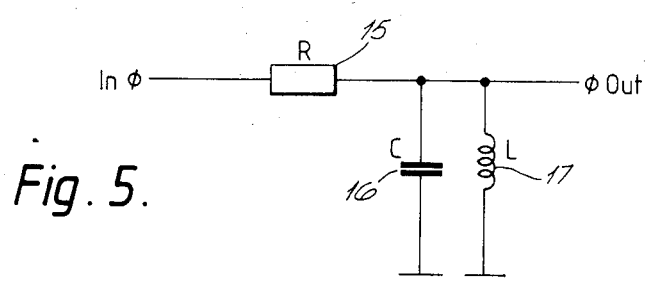
Figure 6:
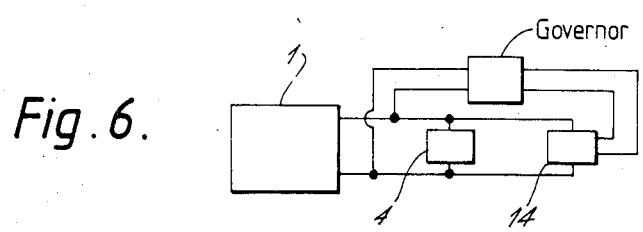
Figure 7:
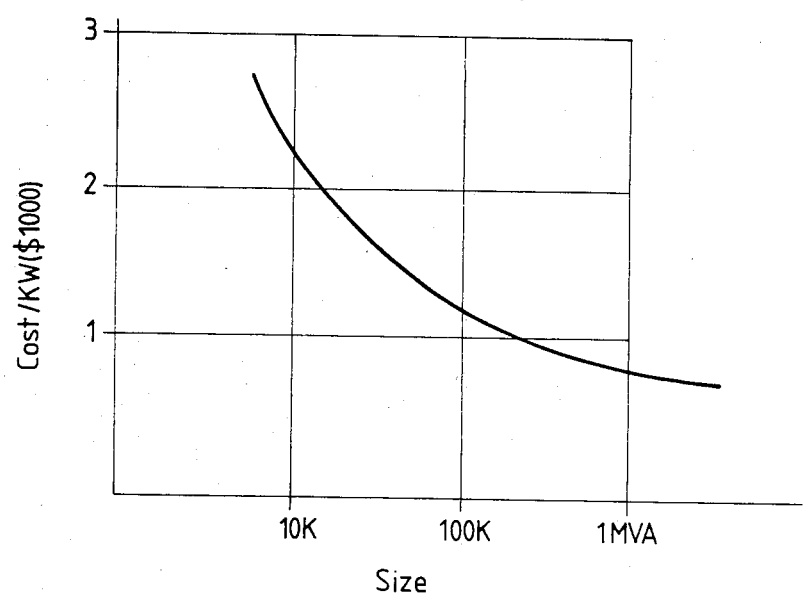
Figure 8:
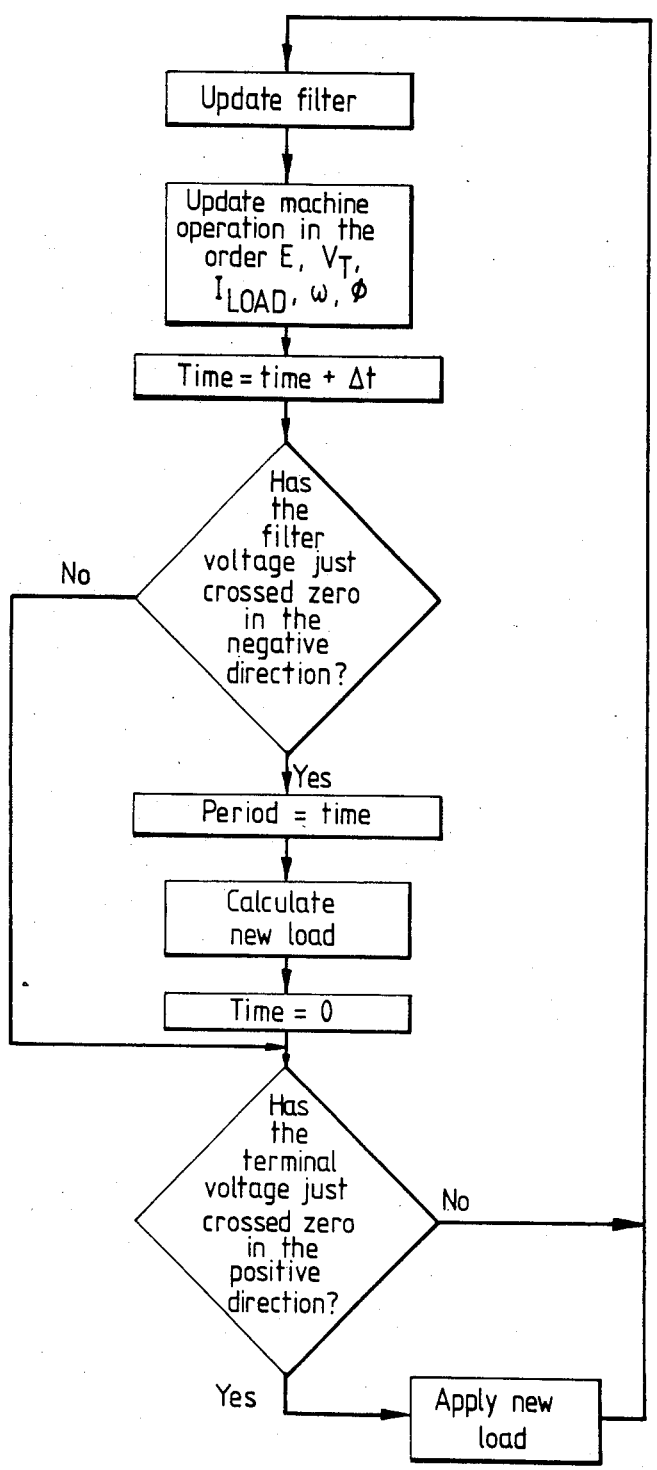
Figure 9:
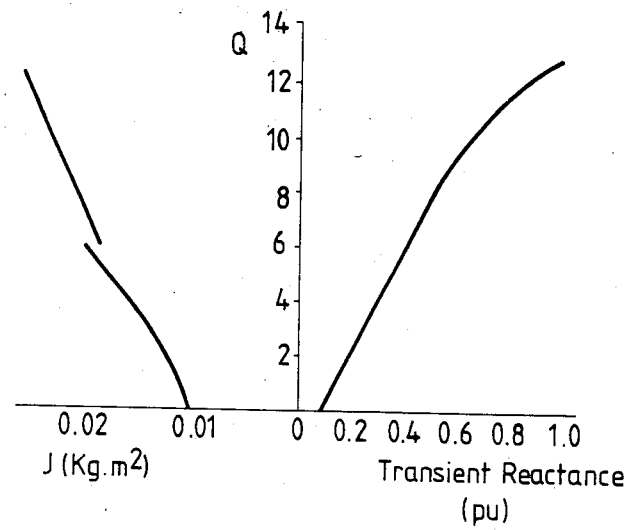
Figure 12:
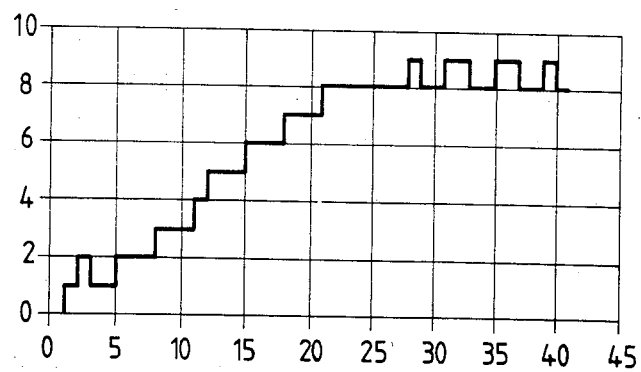
Figure 13:
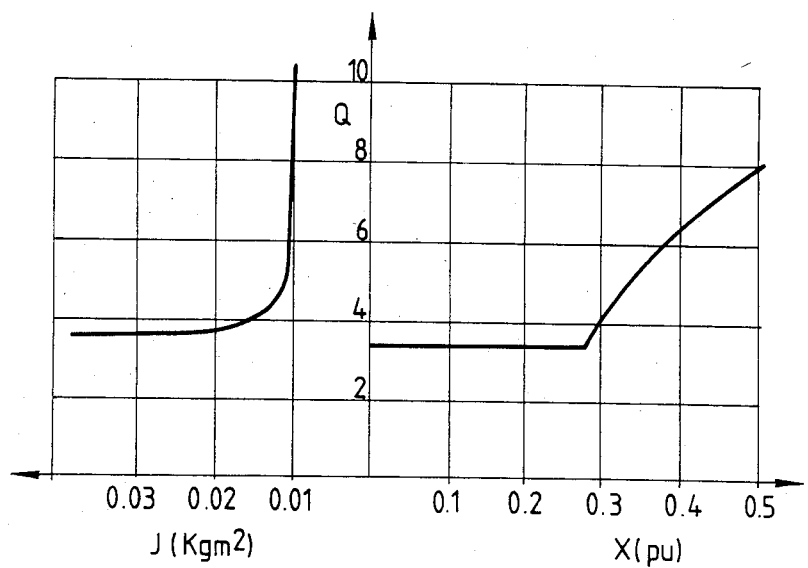
Figure 14C:
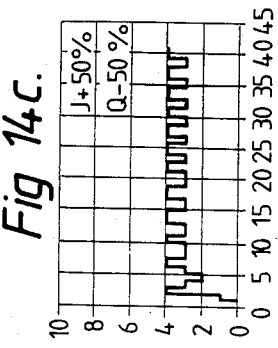
Figure 14B:
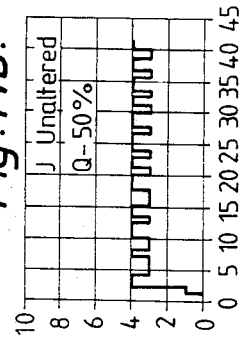
Figure 14A:
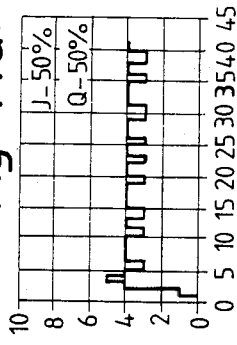
Figure 14F:
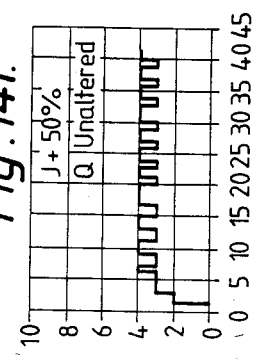
Figure 14E:
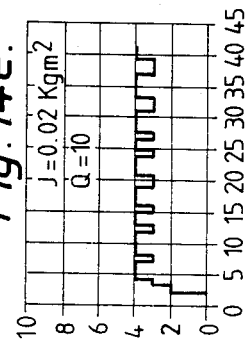
Figure 14D:
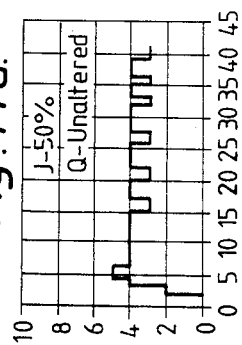
Figure 14I:
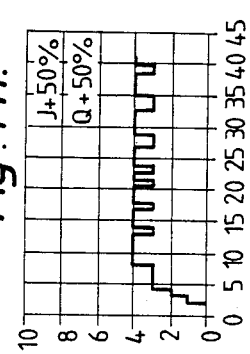
Figure 14H:
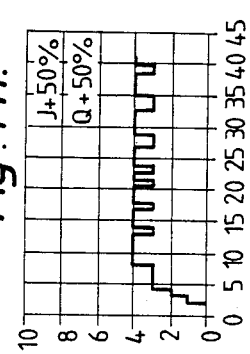
Figure 14G:
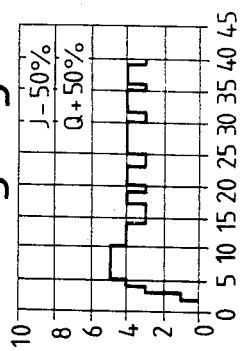

FIG. 4 comprises a schematic electronic load govornor according to one preferred form of the invention;

FIG. 5 is a circuit diagram of a suitable band-pass filter for use in the circuit of FIG. 4;

FIG. 6 is a diagrammatic representation of an electronic load governor according to the present invention in use;

FIG. 7 shows a plot indicating the cost per kw in thousands of dollars against the size of the generation plant of a hydro-electric generation plant;

FIG. 8 is a flow diagram of the load governor/synchronous generator simulation;

FIG. 9 is a plot giving values of inertia and filter Q to obtain good step responses for given transient reactance;

FIGS. 10a–10i simulated step responses of the load governor in conjunction with a synchronous generator having a transient reactance of 0.3 pu. The filter Q and system inertia J are varied from the centre response;

FIGS. 11a–11i simulated step responses of the load governor in conjunction with a synchronous generator having a transient reactance of 0.8 pu. The filter Q and system inertia J are varied from the centre response;

FIG. 12 shows the load governor's simulated step response in conjunction with poor voltage regulation of the synchronous generator;

FIG. 13 is a plot giving values of inertia and filter Q required to obtain good step responses with an induction generator;

FIGS. 14a–14i simulated step response of the load governor in conjunction with a self-excited induction generator having a total leakage reactance of 0.16 pu and a rated slip of 0.04 pu. The filter Q and system inertia J are varied from the centre response; and FIGS. 15a–15e show simulated step responses for the self-excited induction generator and two synchronous generators for Q=10 and J=0.02 kgm$^3$. The filter centre frequency is varied.

One preferred form of the invention will now be described:

An electronic load governor as envisaged in the present invention, is shown schematically in FIG. 4. The input single phase voltage to the governor is provided by the output voltage of the generator 1 and is filtered by a band-pass frequency filter 6 with a centre frequency of 50 Hz and is then squared up with a hard-limiter circuit 7. The input to the controller is a direct input from the generator output but reduced, for example, by a resistive divider. If a three phase generator is used a controller and dump loads are provided for each phase. Transitions from circuit 7, for example, positive going transitions are then used to preset a counter 8 to a count of −512. This counter counts pulses from a pulse generator such as a crystal controlled pulse source 9 operating at a frequency of 26 kHz. On each positive going zero crossing of the input voltage, the value in counter 8 is read into Quad D flip flop 10 and counter 8 is reset. The output of counter 8 is arranged so that negative counts appear as zero at the output while counting is inhibited at a count of +15. At a frequency of exactly 50 Hz 520 pulses will be counted and the value read into flip flop 10 will be +8. As the frequency varies the value in flip flop 10 will vary, at frequencies below the equivalent of 527 counts (49.336 Hz) the value will be 15 and at frequencies higher than 512, counts equivalent (50.781 Hz) the value will be zero. Between these two frequencies the count in flip flop 10 will vary in proportion to the period of the incoming voltage, which is very nearly in proportion to the input frequency.

On negative going zero crossings of the input voltage limiter 11 clocks flip flop 12 and reads the value in flip flop 10. The output of flip flop 12 is the complement of the input. The output of flip flop 12 is used to turn on triacs 13 which switch dump loads 14 which are conveniently binary weighted resistors.

Thus for example, if the frequency is 49.336 Hz or below the counter 8 output and the output of flip flop 10 will be 15 (1111 in binary), the output of flip flop 12 will be 0 (0000 in binary) and no triacs 13 will be gated on. At 50.781 Hz the output of flip flop 10 will be 0, the output of flip flop 12 will be 15 (1111 binary) and all the triacs 13 will be gated on. Between these two extremes triacs 13 will be switched on in such a way that the load increases as the frequency increases and vice versa. Outside these extremes either full or zero load is switched. The dump loads 14 are conveniently arranged in a binary sequency to match the output of flip flop 12 and to minimize the number of triac switches 13 required. The maximum load with all triacs 13 on corresponds to a resistance of (8/15×R).

Since limiter 11 is active on the (negative) zero crossings all changes in the dump loads are done on the zero crossings as required.

Instability in the dump load controller is caused by the armature reaction of the alternator affecting the phase when loads are switched in controlled by band-pass filter 6. It should be noted that this type of instability is present essentially because phase and frequency are related. Controlling the frequency by monitoring amplitude of the output voltage would not suffer from this problem (since the phase does not affect the peak voltage magnitude) but would not allow the controller to be placed anywhere in the system.

Band-pass filter 6 is used to filter noise signals and also the apparent frequency signal as measured by the time between zero crossings of the output voltage. This filtering is of a highly non-linear nature (since variable frequency is essentially non-linear) and the application of a band-pass filter to filter phase angle and frequency is, to our knowledge, not known in the art.

A circuit diagram for the band-pass filter is shown in FIG. 5. It comprises resistor 15, capacitor 16 and inductor 17. The transfer function of this circuit as a frequency filter cannot be written down in classical symbols but must be determined numerically with a computer.

In practice the filter can be made up with operational amplifiers, to reduce the size and weight of the components, in any of a number of ways known to those skilled in the art of active filter design.

In our experimental experience a filter with a centre frequency of 50 Hz and a Q of 10 (giving a 3 dB bandwidth of 5 Hz) provides adequate filtering for a machine with a synchronous reactance of 1 pu and a frequency variation from 49.336 to 50.781 Hz.

The effect of the band-pass filter on the "hunting" instability is to make it worse. As the load on the machine changes, variations in the alternator's shaft speed cause variations in the electrical frequency which is then substantially filtered so that the variations as measured at the output of the filter are much slower. Thus before the controller can respond to a change in input frequency the alternator shaft speed has changed by so much that the hunting effect must proceed. This instability cannot be controlled electrically by any technique known to us. Furthermore, the action of the filter is, as stated before, highly non-linear and amenable only to computer studies.

The method and appartaus we have used is to add inertia, for example, by use of a flywheel, to the input shaft of the alternator so that mechanically the frequency cannot vary at a faster rate than the filter is capable of reponding to. The actual inertia that must be added depends on the filter bandwidth (which is set by the synchronous reactance of the alternator) and the rotating inertia already present, of both the alternator and the turbine, but in our experience a stored energy of 1 pu power times 1/50 seconds is invariably stable with a filter Q of 10 as set previously.

Thus in a practical case, the filter Q must be set to stabilize the variations caused by the synchronous reactance and then inertia must be added to allow such a narrow band filter to be used. This approach allows both unstable modes to be controlled separately to produce a stable well behaved system.

Thus it can be seen that at least in the preferred form of the invention a method of governing a generator and/or apparatus for governing a generator are provided which have the advantage that substantial cost savings can be achieved in design of the apparatus particularly for low output hydro-electric generation.

Furthermore, instabilities caused by repeated switchings of resistive loads are substantially prevented as is any tendency to low frequency hunting.

A computer simultation of the circuit can be used to determine stable parameters for the filter Q and system inertia.

In simulating the system the assumption is made that the input torque is constant. This is a worst case assumption as it represents zero damping, i.e. as the frequency and speed increase the input power increases. The terminal voltage is assumed to be constant an assumption which often may not be valid. However to some extent this is offset by the first assumption as in practice the decrease in torque with increasing frequency would be accompanied by a drop in voltage if load is applied, with the result that less torque is required for a given load. The reactance X may be either the "transient" or the "sub-transient" reactance depending upon the duration of these effects. For this reason a simulation was run for reactances up to 1.0 pu. Forward Euler approximations of the equations describing the circuit are used over a time step, $\Delta t$, of 5 microseconds. The simulation program switches the consumer load from an equivalent of 8 load steps to one of 4.1 load steps at $t=0$. The response of the load governor is plotted from this time forward. A non-integer number of load steps was chosen to illustrate the switching on and off repetitively of one step to control the frequency. The load governor will attempt to return the machine loading to an equivalent of eight load steps (i.e. the governor load should be 3.9 steps). Before $t=0$ the simulation has been proceeding with constant load on the system for sufficient time to reach steady state conditions (the load must balance the input torque otherwise the frequency will be varying). The equations used to represent the system are:

$$I_R = \frac{(V_T - V_F)}{R} \text{ Amps}$$

$$V_F = V + \frac{(I_R - I_L) \times \Delta t}{C} \text{ Volts}$$

$$I_L = I_L + \frac{V_F \times \Delta t}{L_F} \text{ Amps} \qquad \Delta t = 5 \text{ microseconds}$$

$$E = 230 \sqrt{2} \; \frac{\sqrt{R_{LOAD}^2 + X^2}}{R_{LOAD}} \sin(\phi) \text{ Volts}$$

$$V_T = E - (E - I_{LOAD} R_{LOAD}) \left(1 - \frac{\Delta t \times R_{LOAD}}{L}\right) \text{ Volts}$$

$$I_{LOAD} = \frac{V_T}{R_{LOAD}} \text{ Amps}$$

$$\omega = \omega - \frac{V_T I_{LOAD} \times \Delta t}{J\omega} + \frac{T_I \times \Delta t}{J} \text{ rad/s}$$

$$\phi = \phi + \Delta t \omega \text{ rad}$$

These equations assume that the machine being modelled is two-pole, i.e. the shaft frequency is equal to the generated frequency, where the model used to a 1 kW synchronous generator which defines rated machine current and load. From rated voltage (230 V) the base pu impedance can be calculated and is subsequently used to calculate the transient inductance L from the pu transient reactance X. The simulation solves the equation as outlined in the flow diagram in FIG. 8. The filter and machine equations are updated in the order shown. The time between negative going zero crossings of the filter output voltage (i.e. the measure of the period of the terminal voltage) is used to calculate the number of load steps to be applied. At the next positive going zero crossing of the terminal voltage this load is applied as described previously.

The simulation was run for infinite inertia and a range of transient reactances to determine the value of Q that gave a transient response having an overshoot of just less than 50%, i.e. the switched load remains less than two load steps. This provides a good transient response although the actual amount of overshoot is only approximate because of the stepped nature of the corrective loads. The values of Q obtained are plotted against transient reactance in pu on the right hand side of the graph given in FIG. 9. This procedure determines parameters to obtain a good response to instabilities at the switching frequency. The same approach was adopted for stabilising the instability between the response time of the governor and the rate at which the frequency can vary. A transient reactance of 0.01 pu was chosen to minimise interaction with loop 1. The required inertia was determined for a given Q. These results were plotted on the left hand side of FIG. 9 for a 1 kW machine.

There exist several solutions to the level of inertia required for a given filter Q. The one plotted in FIG. 9 is that which corresponds to the largest inertia. Thus, provided the inertia is greater than this value, an acceptable transient response will be obtained while lower values of inertia may result in unacceptable responses. However a discontinuity occurs at a Q of 6 where the solution being used for lower values of Q no longer causes an overshoot of 50%. At this point (and for higher values of Q) the next solution (lower inertia) becomes the critical value of inertia. These curves show that for increased transient reactance a higher filter Q is required which results in the need for greater rotational inertia.

The following procedure is used to determine the chosen values of Q and inertia
(1) Date required
   machine kW rating
   number of pole pairs
   pu transient reactance
(2) Enter the right hand side of FIG. 9 with the value of transient reactance to obtain the required filter Q.
(3) The required inertia can then be obtained from the left hand side of the graph. This has to be modified in the following way:

$$J_m = J \times \text{machine size (kW)} \times (\text{number of pole pairs})^2 \text{ kgm}^2$$

The transient responses obtained using the values for J and Q determined in this way are plotted for transient reactances of 0.3 and 0.8 pu in FIGS. 10 and 11 respectively. The load governor under steady state conditions should be attempting to apply a load of the same 3.9 steps. The central response corresponds to the values of Q and J selected above to provide the required response within each loop, while the column to the left has J reduced by 50%, the column to the right has J increased by 50%, the upper row has Q reduced by 50% and the lower row has Q increased by 50%. As expected with reduced Q the armature reaction effect becomes dominant with instabilities arising at the switching frequency, while low inertia causes low frequency cycling.

In practice therefore a Q of 10 is found suitable for most cases.

The simulation also shows what may happen if the system has poor voltage regulation. In the example shown in FIG. 12 the same imbalance between input and load torques (i.e. same step in $T_e$) was applied as in the responses shown above. A controlled load of slightly less than 4.0 should have been applied. However, as shown, it is possible for the load governor to have to switch in more load steps to control the system frequency because of the drop in generated voltage.

Although this analysis involves many simplifying assumptions the results provide excellent agreement with the observed operation of the load governor.

For an induction generator an analysis of the relationship between filter Q, phase shift at the generator output, inertia, and governor response has been carried out based on that used for synchronous generator. The slip of the induction generator is included and is assumed proportional to load and to instantaneously change with changes in load. This assumption is made as there is no energy storage in the machine and thus added load can only be supplied by a change in slip occurring almost instantaneously. As shown the inertia is effective at the shaft frequency $\omega_r$ rather than at the generated frequency. The equation used for updating the frequency of the synchronous generator is replaced by the following equations:

$$\omega_s = 4 \times \pi \times \frac{\text{LOAD (kW)}}{\text{RATED LOAD (kW)}} \text{ rad/s}$$

ie the rated slip is assumed to be 0.04 pu $$\omega_r = \omega_r - \frac{V_T \times I_{LOAD} \times \Delta t}{J(\omega_r - \omega_s)} + \frac{T_I \times \Delta t}{J} \text{ rad/s}$$

$$\omega = \omega_r - \omega_s \text{ rad/s}$$

Typically an induction machine has a leakage reactance of round 0.16 pu and variations in this reactance have no effect on the minimum Q, as the instantaneous shift in output frequency becomes dominant. At leakage reactances of greater than 0.3 pu the step in frequency with load is no longer dominant and the characteristics of the curve for filter Q is very similar to that for the synchronous generator. The significant difference compared to the synchronous case is that the inertia required remains substantially constant as Q is increased beyond a value of about five (there is obviously an upper limit to this). At the minimum Q (=3.4) the required inertia is too large to be used in practice. The advantage of increasing Q is that the load governor becomes less sensitive to noise in the system. For these reasons it is suggested that a Q of 10 and an inertia of 0.02 kg-m$^2$ (the inertia having to be scaled from a 1 Kw, 2 pole machine as before) be used for all schemes utilising induction generators. The transient responses for these values are shown (same format as for the synchronous cases) in FIG. 14. These responses show the induction machine's low sensitivity to changes in inertia and Q as well as the improved system dynamic response compared to that using a synchronous generator.

The selection procedure for use with the induction generator has been simplified to scaling the inertia from that chosen for the 1 kW, 2 pole machine (i.e. J=0.02 kg-m$^2$, Q=10). In practice such simplifications are highly desirable and for this reason it is recommended that the same values be adopted for the synchronous generator also. The centre row of responses in FIG. 15 show the effect of using these values with an induction generator, a synchronous generator with a transient reactance of 0.3 pu, and a synchronous genrator with a transient reactance of 0.8 pu respectively. All three responses are acceptable although that for the synchronous generator with 0.3 pu transient reactance is not quite as good as obtained using the procedure outlined above. The effect of variations in rated slip of the induction machine is illustrated in the responses (a) and (f). As is expected decreasing rated slip results in a slower transient response and thus a lower level of inertia could be used to improve the response time. The converse is also true for increasing rated slip as shown in step response (f). The two reasons (b) and (g) are for the synchronous generator with 0.3 pu transient reactance and they illustrate the minimal effect of the filters being incorrectly tuned. The upper response has the centre frequency of the filter reduced by 2% and the lower increased by 2%.

What is claimed is

1. Apparatus for governing a generator having an alternating output voltage comprising a plurality of dump loads electrically associated or associable with the electrical output of said generator measurement means to measure the alternating output voltage frequency, detection means to detect a change in the measured output voltage frequency of said generator, switching means to, in use, switch one or more said dump loads into or out of association with said generator in response to said detected frequency change so as to vary said alternating output voltage frequency so as to substantially compensate for said detected frequency change, and damping means to damp the rate at which said alternating output voltage frequency occurs and
   wherein said measurement means comprises a band-pass filter to receive incoming signals, a pulse generator to generate count pulses and a counter to count said count pulses for a period determined by the frequency of said incoming signals passed by said band-pass filter.

2. Apparatus for governing a generator as claimed in claim 1 wherein said switching means comprises a plurality of triac switches, one for each dump load, and means to turn said triac switches on or off so as to provide a dump load substantially in inverse proportion to the number of said count pulses counted by said counter.

3. Apparatus for governing a generator as claimed in claim 1 wherein
   said period of said counter of said measurement means to count pulses determined by the frequency of said incoming signals passed by said band-pass filter is substantially defined by successive similar-direction zero crossings of said incoming signal.

4. The apparatus for governing a generator as claimed in claim 1 wherein
   said period of said counter of said measurement means to count pulses determined by the frequency of said incoming signals passed by said band-pass filter is substantially defined by successive zero crossings of said incoming signal.

5. A method of governing a generator having an alternating output voltage comprising the steps of:
   (a) providing a plurality of dump loads electrically associated with said generator,
   (b) measuring the alternating output voltage frequency by the steps of:
      (b1) measuring the phase voltage across the output of said generator
      (b2) passing said measured signal through a band-pass filter to provide pulses indicating the frequency of said phase voltage; and
      (b3) providing a sequence of count pulses and counting the number of said count pulses between successive zero crossings of said measured signal,
   (c) detecting a change in measured output voltage frequency of said generator,
   (d) varying the number of dump loads across the output of said generator in response to said detected frequency change to vary said alternating output voltage frequency so as to substantially compensate for said detected frequency change; and
   (e) damping the rate at which said compensating alternating output voltage frequency change occurs.

6. The method of claim 5 wherein said step (d) of varying the number of dump loads comprises the step of switching the number of dump loads in inverse response to the number of count pulses counted in said step (b3).

* * * * *